Patented June 5, 1945

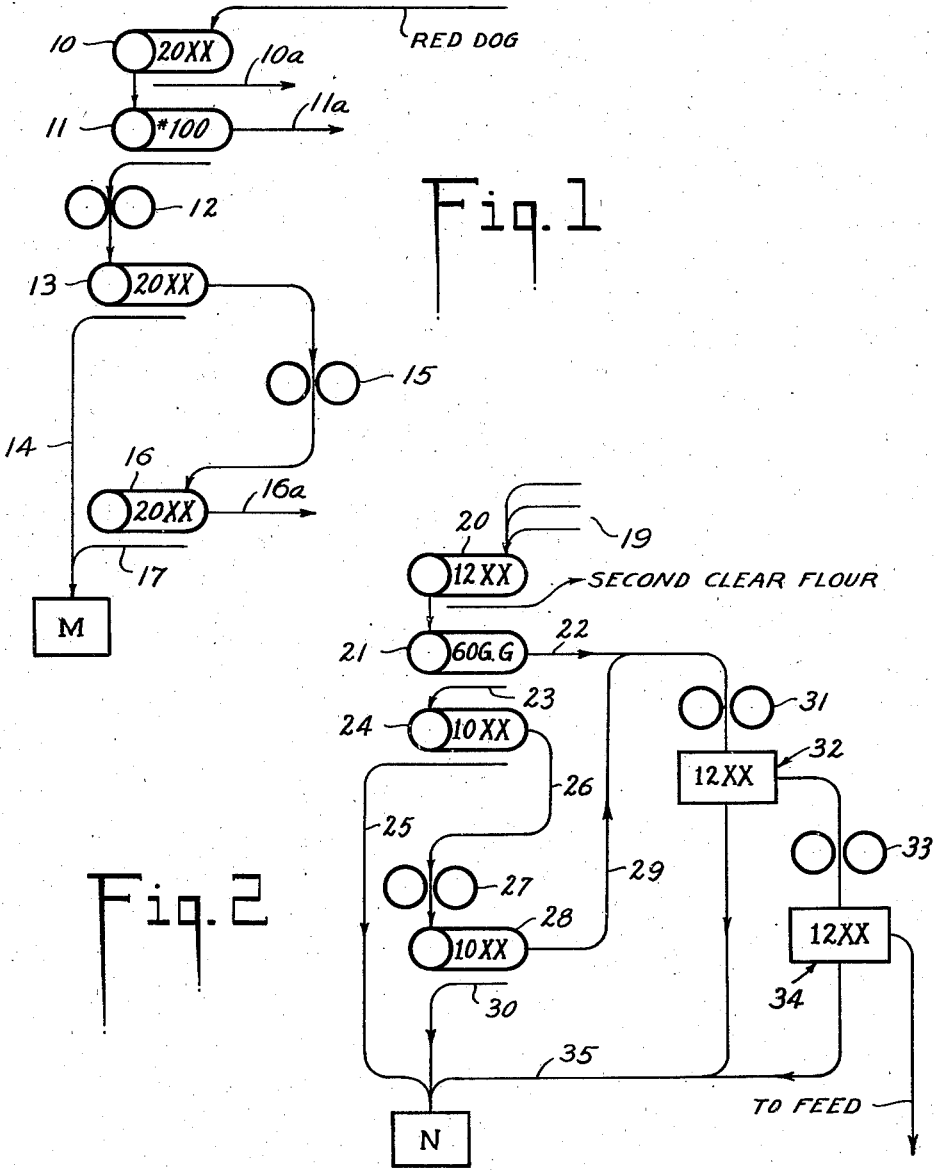

2,377,741

UNITED STATES PATENT OFFICE 2,377,741

NATURAL HIGH VITAMIN FLOUR PROCESS

John S. Andrews and Reginald C. Sherwood, St. Paul, Minn., assignors to General Mills, Inc., a corporation of Delaware Application June 4, 1941, Serial No. 396,574

8 Claims. (Cl. 241—11)

This invention relates to a white flour having a high natural vitamin content and still possessing good baking properties such as dough handling characteristics, loaf volume, external loaf appearance, grain and texture, and to a process of producing the same.

Attempts to produce the flour described by millers as "long extraction flour" with high vitamin content simply by removing the outer layer of bran by "peeling" or otherwise decorticating the kernel, have resulted in the production of flour which is higher in vitamin content than patent flour, but such flours produced commercially have been dark in color and are generally very similar to whole wheat flour in appearance and in keeping and baking properties.

An object of this invention is to provide a wheat flour which has substantially the same thiamin or other vitamin content as whole wheat but with elimination of a large part of the roughage.

Another object is the provision of a high vitamin wheat fraction from the "tailings" of a mill and from streams that heretofore have gone into shorts, "red dog" and feeds generally.

Still another object is to provide suitable processes for removing a large part of the roughage, particularly course fiber, from said mill streams so that they can be mixed with patent, straight or standard white flour to produce a blend which has the approximate vitamin potency of whole wheat and which will still be rated as white flour although somewhat darker than patent flour.

These and other objects as will hereinafter appear are accomplished by our invention which is fully described in the following specification and shown in the accompanying drawing in which Figure 1 shows diagrammatically an experimental mill for removing from red dog high vitamin fractions; and Fig. 2 is a similar view of the "tail" end of a mill for removing high vitamin fractions from the tail streams of the mill on a commercial scale.

In the usual flour milling process, one of the main objectives is the separation of endosperm, principally in the form of granular middlings, from the germ and from the outer layers of the wheat kernel, which are described in general as bran, but which consist of several layers of somewhat different types of tissues (epidermis, epicarp, endocarp, testa, episperm, aleurone).

The purpose of making the separation between endosperm and outer tissues and germ is to permit the production of the fine white flour, which is creamy in color, this color depending solely upon the content of carotinoid pigments naturally existent in the endosperm and free from color contributed by bran and associated layers which contain a higher percentage of red and brown pigments, which in turn detract from the appearance of the flour.

This separation between endosperm and the outer layer produces a white flour with excellent dough-handling properties. Some of the tissues other than endosperm, notably germ, have a detrimental effect upon the gluten formed from gliadin and glutenin when flour is made into a dough. The reasons for the deteriorating effects of the germ tissue are not fully understood but this impairment consists in lowered mixing tolerance and softening of the dough during fermentation.

As described above, the two principal reasons for making a careful separation between endosperm and outer layers of the kernel are to attain the whitest, clearest color possible in the finished flour, and the best dough-handling properties, both factors being of importance in the production of the type of bread that will meet consumer demand.

However, it has long been recognized that white flour, commonly described as patent flour, has a lower vitamin content than whole wheat. The whole grain especially rich in thiamin is also considered a fairly good source of riboflavin and nicotinic acid, and contains other components of the vitamin B complex not so well known in human nutrition.

Because of the increased interest in vitamins in recent years, and the increased knowledge that milling processes now commonly used remove a large portion of certain vitamins, millers have sought by various means to raise the vitamin content of flour without losing the much desired baking properties of white flour. Many of these efforts have proved fruitless.

In Fig. 1 is shown diagrammatically an experimental mill in which a sample of red dog from a commercial spring wheat stream was further milled to produce a high vitamin fraction of the type described.

Starting with the red dog, it was run through a 20xx sieve 10, the "throughs" 10a having a thiamin content of 4.6 I. U./gm. (International units per gram) were rejected as too low while the "overs" were sifted again on #100 sieve 11. The overs 11a having a thiamin content of 4 I. U./gm. were rejected. The throughs were ground on smooth rolls 12 and then sifted on a 20xx sifter 13, the throughs of the latter sifter having a thiamin content of 12.8 I. U./gm. and constituting about 13.5% of the original sample were saved as a high vitamin fraction 14.

The overs were ground on smooth rolls 15 and passed to the 20xx sieve 16. The throughs having a thiamin content of about 13.3 I. U./gm. were saved as a high vitamin fraction 17 constituting about 6.5% of the original sample of red dog, and mixed with the fraction 14. The overs from the sieve 16 having a thiamin content of 5.6 I. U./gm. were rejected. The latter stream was further milled but failed to show any thiamin content sufficiently high to warrant retaining it. The fractions 14 and 17 are mixed to make the high vitamin fraction M.

The foregoing example is illustrative of the process of how the high vitamin streams can be located and separated from the deleterious elements such as crude fiber and low thiamin flour. The red dog stream from which this high vitamin fraction was derived varies somewhat in different mills and in different localities due to differences in the wheat from which they are derived and to different milling practices, but we find that this high vitamin fraction is found in all cases in the tailings streams leading to shorts and red dog. Any miller given the foregoing outline and method of procedure can vary it to suit his own milling system in order to separate out the high vitamin fraction relatively free from crude fiber.

Fig. 2 shows diagrammatically how the process of separating the high vitamin fraction can be accomplished in a mill. The streams in the "tail" of the mill high in vitamin are located and led to the point 19 and are fed into a reel having a 12xx cloth. The throughs go to second clear flour while the overs pass to reel 21 having a 60 GG cloth. The overs 22 are preferably further processed as will later be explained. The throughs 23 pass to a reel 24 preferably 10xx, the throughs 25 of this reel being a high-vitamin fraction which is passed to a bin N and saved for enriching flour.

The overs 26 are further ground between smooth rolls 27 having a differential speed of 3 to 2 and are then fed to a reel 28 having 10xx cloth. The overs 29 are preferably further processed while the throughs 30 high in thiamin are passed to the bin N and combined with the stream 25.

The overs 22 and 29 may, if desired, be further ground and sifted to recover still more of the high vitamin fraction. Thus, they go to smooth rolls 31 and thence to a high speed sifter 32, the overs passing to rolls 33 and then to a second high speed sifter 34, the overs from the latter going to feed. The throughs from both the sifters 32 and 34 pass through the line 35 to the bin N.

The mill streams to be used are a composite of selected streams made up primarily of layers of the wheat kernal just beneath the outer bran layer and containing only a small amount of inner endosperm.

In both these processes, there are three essential steps involved: first, collecting certain tailing streams high in thiamin and sifting out fine flour low in thiamin; second, grinding the overs to knock off tissues closely adhering to the bran; and third, sifting to separate high thiamin fractions from tissues high in crude fiber and low in thiamin.

We have found that the portions of the wheat berry outside of the endosperm but underneath the outer bran or pericarp are very rich in thiamin and riboflavin and may be separated as selected fractions of mill streams by suitable grinding, sifting and blending operations.

The following table shows typical values for the high vitamin fraction as compared to the fortified flour, patent flour and whole wheat flour.

|  | High-vitamin fraction | Fortified flour | Patent flour | Whole wheat flour |
| --- | --- | --- | --- | --- |
| Moisture_____per cent__ | 13.5 | 13.5 | 13.5 | 13.5 |
| Protein_____do____ | 17.5 | 13.2 | 12.5 | 14.0 |
| Ash_____do____ | 2.8 | 0.8 | 0.4 | 1.7 |
| Fat (ether extract)__do____ | 4.8 | 1.6 | 1.0 | 2.4 |
| Crude fiber_____do____ | 1.0 | 0.3 | 0.2 | 2.5 |
| Thiamin, International units per gram_____ | 10.5 | 1.8 | 0.2 | 1.6 |
| Riboflavin, micrograms per gram_____ | 4.0 | 1.7 | 0.5 | 1.9 |

The high vitamin fraction may vary considerably. Thus, thiamin may be 8 to 16 I. U./gm., fat 4 to 6%, crude fiber 1 to 2% and ash 2 to 4%.

This high thiamin component is present in the tail of the mill and ultimately finds its way into the low grade products little used for human consumption, such as bran, shorts and red dog. By separating this component and then combining it to the extent of about 10-20% with straight grade flour or patent flour, or a similar extraction, there is produced a new type of wheat flour with thiamin content equal to or exceeding the thiamin content of whole wheat, and with baking properties closely approaching straight grade flour with respect to loaf volume, external appearance of the loaf, crumb, grain and texture. The color of the crumb is not quite as white as patent or straight grade flour, but is entirely dissimilar from the color of whole wheat flour. This new flour also is materially enhanced in riboflavin, nicotinic acid, and vitamin E content and shows some increase in the other vitamins such as pantothenic acid and vitamin $B_6$.

In practicing our invention, the "high vitamin components" that are rich in thiamin are obtained in the milling operation from fractions separated in the low grade purifiers operating on mixtures of partially ground endosperm and portions of the outer layers of the kernel. In the purifier, a separation is made between flour fine enough to pass flour silks of sizes varying from 10 XX to 13 XX, particles which are just a little too coarse to pass the silks, and coarser. These partially ground particles are delivered again to grinding rolls, where they are reduced to smaller size. With each such grinding in the mill on the rolls located near the "tail" of the mill there is a separation of fractions of the wheat kernal that consist quite largely of the layers outside the endosperm and underneath the outer bran or pericarp. These fractions do not consist of single tissues of the wheat kernel, but are mixtures of endosperm and the outer layers, particularly the aleurone layer. It is from these mixtures that the fractions highest in thiamin content are obtained.

In the normal process of milling, such mixtures when sufficiently ground to pass 10 XX to 13 XX silks, are spouted principally to second clear flour not generally used for human consumption. If the particles are too coarse to pass these flour silks, they are frequently spouted to low grade flour, which is commonly called "red dog." By recovering certain of the fractions normally directed to second clear flour and to red dog, and removing them from the streams farther back in the mill, it is possible to segregate and then grind to the fineness of flour those fractions which are richest in thiamin and least contaminated with embryo and bran fragments. Such fractions, thus segregated, ground, sifted and blended with patent or straight grade flour, contribute the desired proportion of thiamin. The potency of the component determines the amount to be added to straight grade flour, but it is usually necessary to add 10 to 20% of these fractions to bring the flour up to the desired thiamin content.

The new operations detailing the separation are clearly illustrated by way of example in the drawing which of course represents only one typical flow sheet. The remainder of the process is simply a blending operation, the percentage to be added being based on actual vitamin tests.

A further important feature should also be mentioned. It is significant that we have been able to produce this new type of flour with the thiamin content of whole wheat, at the same time practically doubling the mineral content compared to long patent flour but yet holding the mineral content within the limits of total ash prescribed by the Federal food and drug standard now in effect. This may be regarded as an accomplishment, since whole wheat contains on the average 1.65% of ash. By selecting the proper fractions of the kernel and discarding the remainder, we have been able to eliminate portions of the grain that are high in crude fiber and highest in mineral content, so that this new flour meets the definition and standard of identity of flour in ash content as well as in other respects, and therefore legally is considered white flour and can be thus labeled.

This natural high-vitamin flour may be further fortified by suitable addition of other vitamins and minerals; this may be desired to conform with various standards such as the current government levels for "enriched flour." For such a purpose, one might add a supplement of nicotinic acid, riboflavin, and calcium and iron compounds.

Bread prepared from flour made according to this invention has a pleasing wheat flavor with high vitamin and mineral content and without the roughage content that accompanies whole wheat flour.

We have stated that 10-20% of our high vitamin fraction is added to white flour when it is desired to make a product which is equivalent to whole wheat in thiamin content. If a different level of thiamin is desired the proportion is adjusted accordingly. The standard to be attained in the fortified flour may also be based on one of the other constituents, such as riboflavin or nicotinic acid. Depending upon the object desired, the amount to be added may vary from several per cent up to 25%. The maximum upper limit is determined largely by the effect on the baking properties.

The terminology used throughout this specification is standard in the milling industry and is to be so interpreted.

While we have shown and described but a few embodiments of our invention, it is to be understood that it is capable of many modifications. Changes, therefore, in the method or article may be made which do not depart from the spirit and scope of the appended claims.

We claim as our invention:

1. The process of milling to recover a high vitamin wheat fraction comprising selecting a tailings stream leading to shorts and red dog and having a thiamin content several times that of whole wheat, and sifting out the crude fiber so as to reduce its content to much less than that of whole wheat flour.

2. The process of milling to recover a high vitamin wheat fraction comprising selecting a tailings stream leading to shorts and red dog and having a thiamin content several times that of whole wheat, sifting out the crude fiber so as to reduce its content to much less than that of whole wheat flour, and further sifting out material relatively low in thiamin to leave a fraction high in thiamin.

3. The process of milling to recover a high vitamin wheat fraction comprising selecting a tailings stream leading to shorts and red dog and having a thiamin content several times that of whole wheat, sifting out fine flour low in thiamin, grinding the overs to knock off tissues closely adhering to the bran, and sifting to separate the high thiamin fraction from the high fibrous lower thiamin tissues.

4. The process of milling to recover a high vitamin wheat fraction comprising selecting from the tailings of a mill, a stream relatively high in thiamin, subjecting said stream to a first sifting operation to remove as throughs, fine material low in thiamin, subjecting the overs from said first sifting operation to a second sifting operation to remove as overs, coarse material low in thiamin, and subjecting the throughs from said second sifting operation to a milling operation to knock off tissues closely adhering to the bran, and sifting to separate the high vitamin fraction from the high fibrous lower thiamin tissues.

5. Process according to claim 4 in which the high fibrous lower thiamin tissues are subjected to milling and sifting operations to recover as fines additional material high in thiamin.

6. The process of milling to recover a high vitamin wheat fraction which comprises selecting from the tailings of a mill, a stream relatively high in thiamin, subjecting said stream to a first sifting operation to remove as throughs fine material low in thiamin, subjecting the overs from said first sifting operation to a second sifting operation to remove as overs coarse material relatively high in fiber, subjecting said coarse material to a milling and sifting operation to separate low fiber high thiamin material from high fiber material, and recovering additional high thiamin low fiber material from the throughs from said second sifting operation.

7. Process according to claim 6 in which coarse fibrous material in the throughs from the second sifting operation is subjected to a milling and sifting operation to remove high fiber low thiamin material therefrom.

8. The process of milling to recover a high vitamin wheat fraction which comprises selecting from the tailings of a mill, a stream relatively high in thiamin, subjecting said stream to a first sifting operation to remove as throughs fine material low in thiamin, subjecting the overs from said first sifting operation to a second sifting operation to remove as overs coarse material relatively high in fiber, subjecting said coarse material to a milling and sifting operation to separate low fiber high thiamin material from high fiber material, subjecting the throughs from the second sifting operation to a third sifting operation to remove coarse material therefrom, subjecting said last-mentioned coarse material to a milling and sifting operation and passing the coarse material from said last-mentioned milling and sifting operation to the milling and sifting operation first mentioned.

JOHN S. ANDREWS.
REGINALD C. SHERWOOD.